United States Patent [19]

Oexmann

[11] Patent Number: 4,716,577

[45] Date of Patent: Dec. 29, 1987

[54] AUTOEQUALIZER

[75] Inventor: Henry E. R. Oexmann, Garland, Tex.

[73] Assignee: Rockwell International Corporation, El Segundo, Calif.

[21] Appl. No.: 882,648

[22] Filed: Jul. 7, 1986

[51] Int. Cl.$^4$ .............................................. H04B 3/04
[52] U.S. Cl. ........................................ 375/15; 333/18
[58] Field of Search ................ 375/12, 14, 15; 333/18

[56] References Cited

U.S. PATENT DOCUMENTS

| | | | |
|---|---|---|---|
| 4,061,978 | 12/1977 | Motley et al. | 375/14 |
| 4,334,313 | 6/1982 | Gitlin et al. | 375/15 |
| 4,594,725 | 6/1986 | Desperben et al. | 375/15 |

*Primary Examiner*—Benedict V. Safourek
*Attorney, Agent, or Firm*—Bruce C. Lutz; V. L. Sewell; H. Fredrick Hamann

[57] ABSTRACT

An autoequalizer having first and second data stores, first and second coefficient stores along with first and second multipliers for multiplying each stored data sample times its corresponding stored coefficient is disclosed. First and second accumulators accumulate the results of the first and second multipliers for an entire window of consecutive data samples. The results from the first and second accumulators are summed with feedback before being tested against various threshold values. In a preferred arrangement, for use with dual information channels, mirror image equalizer elements are connected in a feedback arrangement with each other.

12 Claims, 5 Drawing Figures

FIG. 4b though the values of the constants may differ. In such
AUTOEQUALIZER

TECHNICAL FIELD

The present invention relates generally to autoequalizers and in one of its aspects relates to decision feedback equalizers for signals transmitted orthogonally through a highly distorted channel, while supporting high transmission rates.

It is frequently necessary to use transmission channels which were originally developed for voice transmission for the transmission of high transmission rate digital data. It is common to convert such digital signals to analog and then mix the analog signal with some carrier which is then multiplexed with even more similar carriers before being transmitted over the highly distorting channel. When the signal has been demultiplexed and demodulated at the receiving end, it is severely distorted. The situation is further complicated, because the original digital signal to be transmitted is frequently in the form of a two dimensional array of data, one dimension being carried on each of two separate input channels. The signals must then be somehow combined before they are multiplexed and transmitted.

BACKGROUND ART

In order to transmit a two dimensional array of digital data over a highly distorting channel, it is known to convert each channel to analog and then mix the channels withorthogonal carriers before adding them together. Similarly, it is known to them demodulate the ortogonal signals at theother end before converting them back to a digital form. The signal at that point is known to have two problems, that which can be thought of as "cross talk" between the two channels and the distortion caused by the channel itself. Various kinds of equalizers have been used at that point in an attempt to solve those two problems including a class of equalizers known as decision-feedback equalizers.

DISCLOSURE OF INVENTION

In accordance with the present invention, first and second means for storing a window of consecutive data samples from a continuous data stream are provided for data from the first and second channels rpesectively. First and second means for providing a plurality of constants provide constants corresponding to the consecutive data samples of the first and second storage means respectively. First and second means for mathematically operating operate on each of the consecutive data samples from the first storage means with the first providing means and from the second storage means with the second providing means respectively. First and second means for summing the results, sum the results of the first and second mathematically operating means respectively. A first feedback means in one form acts as means for generating a number corresponding to an expected value for each data sample as it existed before being originally mixed with a carrier. In such an arrangement, a third means for summing sums the results of the first and second summing means with the means for generating an expected value.

In a preferred arrangement, a duplicate system exists although the values of the constants may differ. In such a system, each of the duplicate equalizer elements also includes a second feedback means which feeds back to the other equalizer element.

In one preferred arrangement, the constants are replaced by coefficients which can be constants but need not be. In such an arrangement, the means for mathematically operating are basically multipliers.

A preferred form of both arrangements includes means for dynamically changing the constants or coefficients, what is referred to as "changing on the fly".

These and other objects, advantages and features of this invention will be apparent from the following description taken with reference to the accompanying drawing, wherein is shown the preferred embodiments of the invention.

BEST MODE FOR CARRYING OUT THE INVENTION

Figure 1:
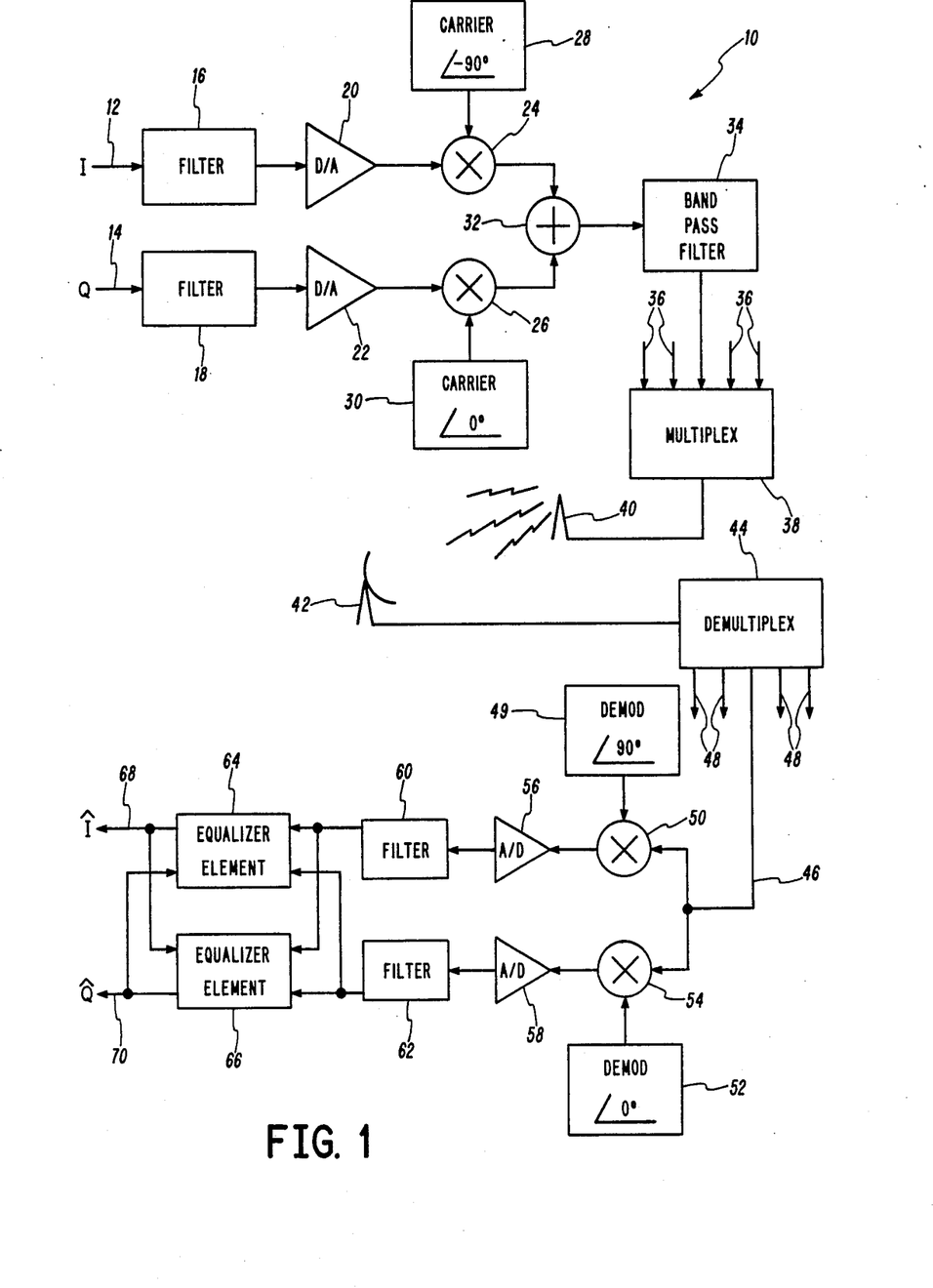
FIG. 1 is a block diagram representation of a communications system employing an autoequalizer according to the present invention.

Referring now to the drawing, and in particular to FIG. 1, a communication system according to the present invention is referred to generally by reference numeral 10. Communication system 10 includes an in-phase data channel 12 and a quad-phase data channel 14 in which data is first passed through finite input response (FIR) filters such as square root of raised cosine filters 16 and 18 respectively. The in-phase and quad-phase data, which may be thought of as forming a two dimensional grid of data points, are then passed through digital to analog converters 20 and 22 respectively. The analog signals are then modulated in mixers 24 and 26 with signals from carrier generators 28 and 30 before being added by summing means 32. The carrier signal generated by carrier generator 28 is the same frequency as that generated by carrier generator 30 but 90 degrees out of phase so that the mixed data stream of the I channel 12 is orthogonal to that of Q channel 14. The orthogonal signals are then passed through a band pass filter 34 before being multiplexed with other signals 36 by means 38. The multiplexed signals are then transmitted by microwave transmitter 40, cable or other suitable transmission means to a receiver 42 where the received signal is then demultiplexed by means 44. Demultiplexing means 44 separates the orthogonal signals of interest 46 from other demultiplexed signals 48. Orthogonal signals 46 are then passed through means for demodulating the signals, one means comprising demodulation signal generator 48 and mixer 50 while the other means comprises demodulation signal generator 52 and mixer 54. Once again, the demodulation signals are of the same frequency but 90 degrees out of phase. The demodulation signals are then converted to digital by analog to digital converters 56 and 58 before again being passed through FIR filters such as square root of raised cosine filters 60 and 62.

A first equalizer element 64 and a second identical equalizer element 66 both receive inputs from both reconstructed orthogonal channels, which is to say both receive inputs from both filter 60 and filter 62. Equalizer element 64 and equalizer element 66 are then connected in a feedback relationship to each other with ultimate outputs 68 and 70 respectively which ideally would be the same as I data channel input 12 and Q data channel input 14 respectively.

Figure 2:
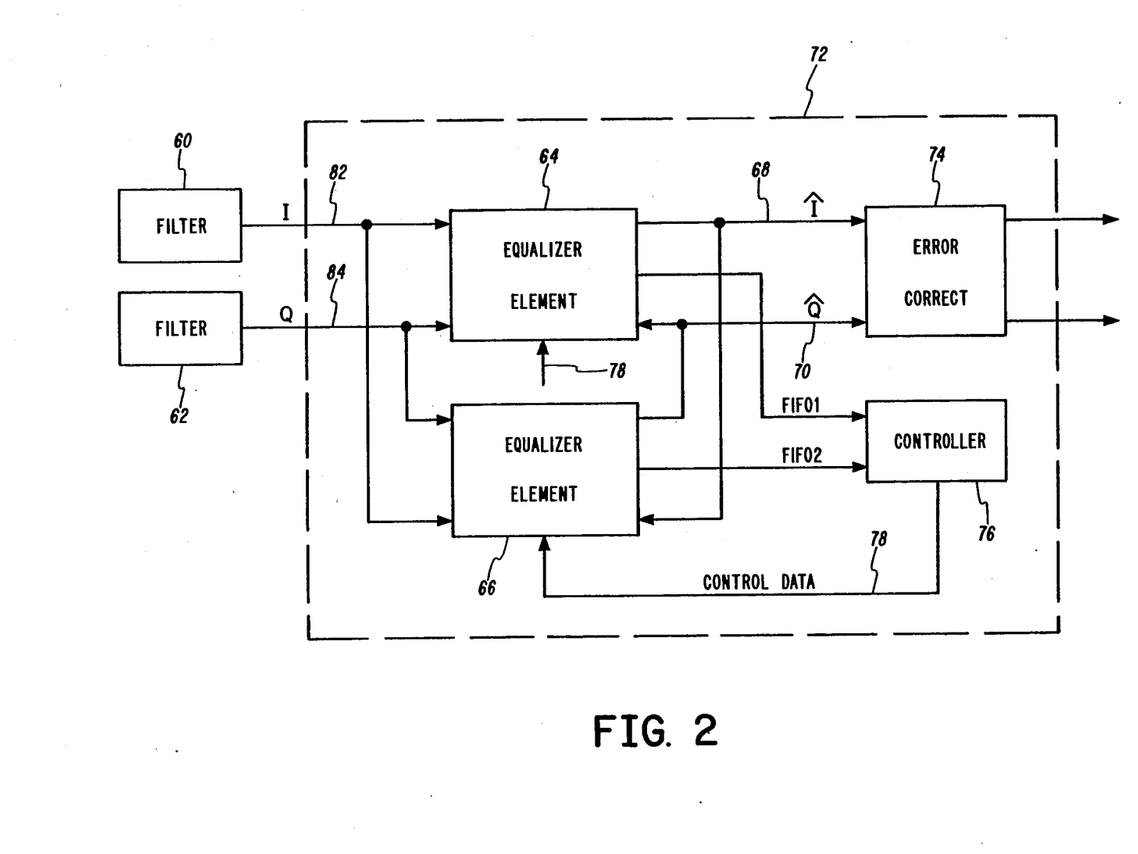
FIG. 2 is a block diagram representation of a preferred arrangement of an autoequalizer according to the present invention.

Referring also to FIG. 2, one preferred form of an autoequalizer according to the present invention is referred to generally by reference numeral 72 and includes means for error correcting 74 which is responsive to output channels 68 and 70 in addition to including a controller 76 which calculates coefficients which are in turn written to equalizer elements 64 and 66. Equalizer elements 64 and 66 thus accept unequalized I and Q data from filters 60 and 62 as well as equalized I and Q data from output channels 68 and 70. The operations of the equalizer elements are set or determined by control data 78 from controller 76.

Figure 3:
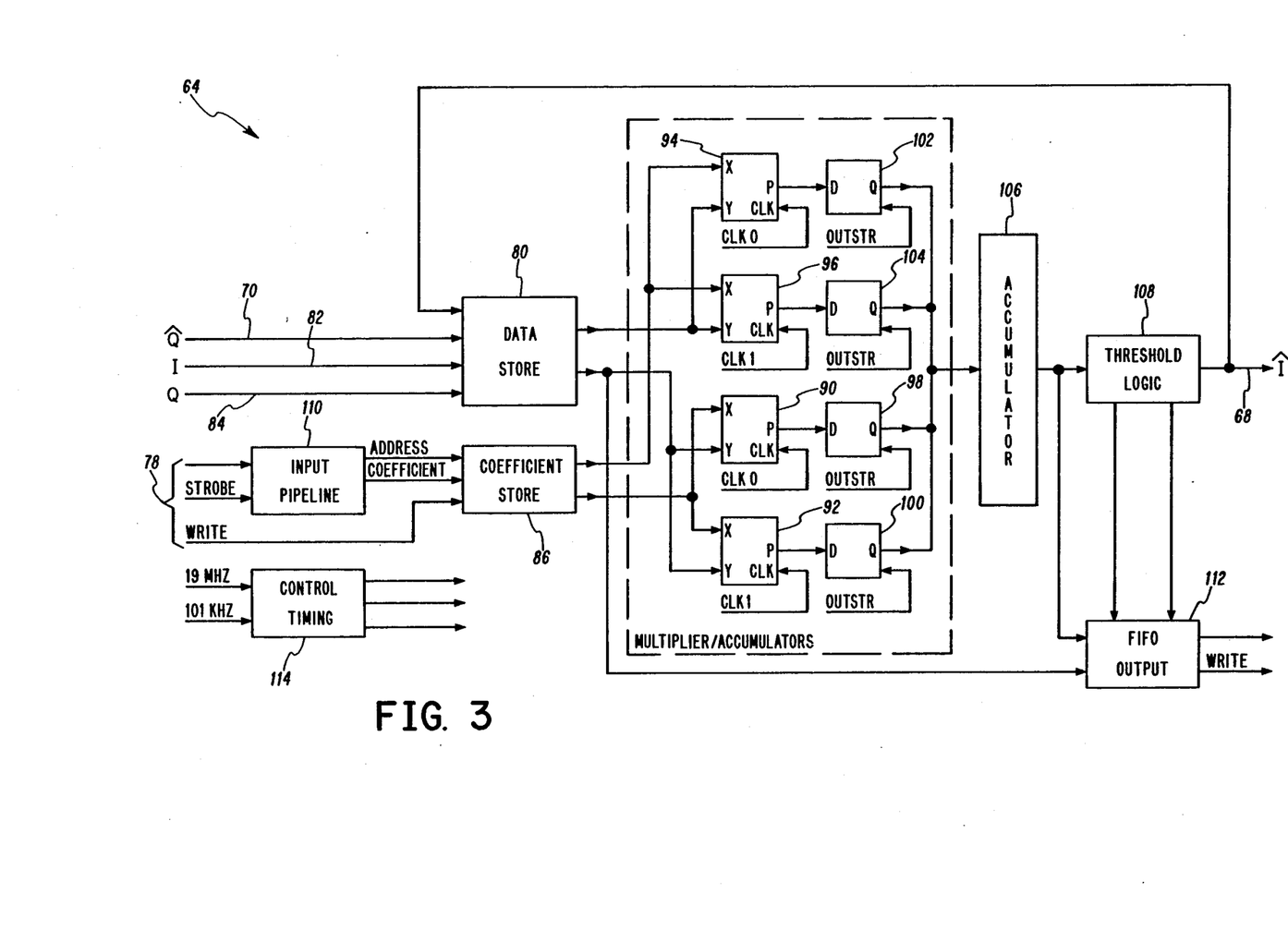
FIG. 3 is a block diagram representation of one equalizer element according to the present invention.

Referring now to FIG. 3, equalizer element 64 includes means 80 for storing a window of consecutive data samples from unequalized continuous data streams 82 and 84, means 86 for storing a plurality of coefficients corresponding to the consecutive data samples and means 90 for multiplying individual data samples from first data channel 82 times the corresponding coefficients. At any given instant of time, the coefficients in means 86 are constants. In the particular arrangement, means 90 is a multiplier, but in a mroe general application, it is means for mathematically operating on each of the consecutive data samples with the corresponding constant from means 86 which forms part of a means for supplying a plurality of constants. Equalizer element 64 also includes means 92 for multiplying individual data samples from second data channel 84 times the corresponding coefficients, means 94 for multiplying individual equalized I data samples from I output channel 68 times the corresponding coefficients, and means 96 for multiplying individual equalized Q data samples from Q output channel 70 times the corresponding coefficients. A first means 98 for summing, sums the results of first means 90 for multiplying, and similarly second means 100, third means 102 and fourth means 104 for summing, sum the results of second means 92, third means 94 and fourth means 96 for multiplying respectively. In the embodiment shown, means 98, 100, 102 and 104 for summing are simply accumulators. Accumulator 106 acts as means for summing the results of first means 98 for summing, second means 100 for summing, third means 102 for summing and fourth means 104 for summing.

As can now be seen, multiplying means 94 cooperates with summing means 102 to act as a first feedback means which in the embodiment shown is a means for generating a number corresponding to an expected value for each data sample as it existed before being originally mixed on the transmitter end. Similarly, fourth multiplying means 96 acts cooperatively with fourth summing means 104 for becoming a feedback means from equalizer element 66 so that the two equalizer elements taken together are in a feedback relationship.

Equalizer element 64 also includes means 108 for testing the results of accumulator 106 against a plurality of predetermined threshold values corresponding to the possible values at I input channel 12.

An input pipeline 110 provides serial-to-parallel conversion of byte-wide data from controller 76. When pipeline 110 is full, controller 76 signals coefficient store 86 to write the new specific coefficient. Input pipeline 110 thus acts as one means for dynamically changing the coefficients.

A FIFO output circuit 112 provides a byte-wide interface to FIFO memories in controller 76.

A control timer 114 controls timing between various parts of the circuit responsively to the repetitive data inputs. Data driven timer 114 provides means for timing means 90, 92, 94 and 96 for multiplying and means 98, 100, 102 and 104 for summing so that the equalizer accepts changes in the number of data samples in the window and the corresponding number of constants without the need for making changes to the circuit. A normal practical limit for the maximum number of data samples is the minimum operating time of multiplying means 90, 92, 94 and 96.

In the arrangement shown, data store 80 comprises simple random access memory as does coefficient store 86. In such an arrangement, data store 80 and coefficient store 86 can each be viewed as four different means for storing where four different areas of RAM each act as a means for storing its corresponding data. In such an arrangement, equalizer element 64 can be constructed with off the shelf components. Means 81 addresses individual data samples within data store 80 and means 87 addresses individual coefficients within coefficient store 86. Means 90, 92, 94 and 96 multiply an addressed data sample or feedback data sample times the corresponding coefficient.

Equalizer element 66 is identical to equalizer element 64 although the coefficients generated by controller 76 might be different from those generated for equalizer element 64.

Figure 4A:
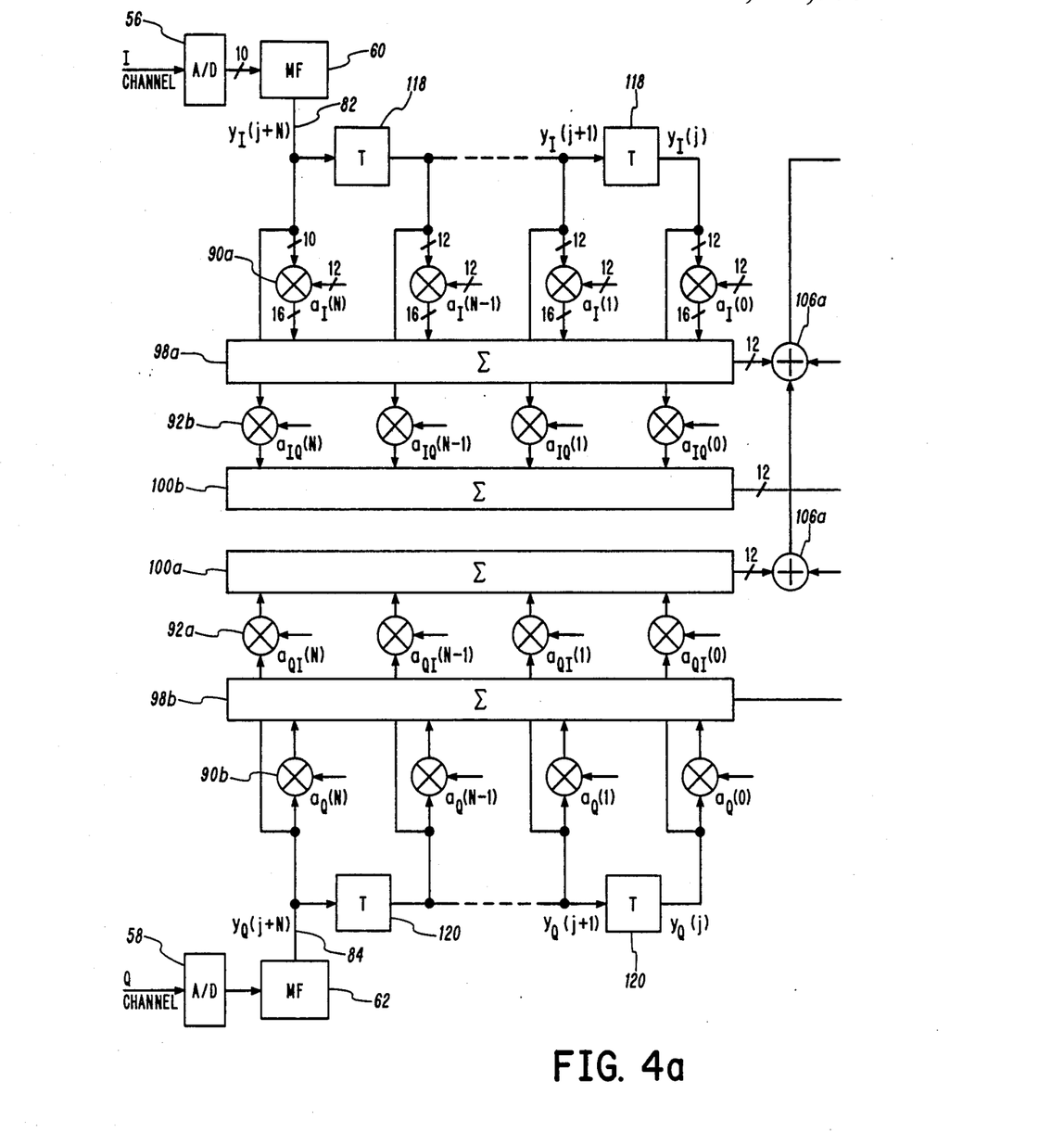
FIG. 4a is a symbolic representation of a preferred form of an equalizer element along with the appropriate analog digital converters and filters according to the present invention.
Figure 4B:
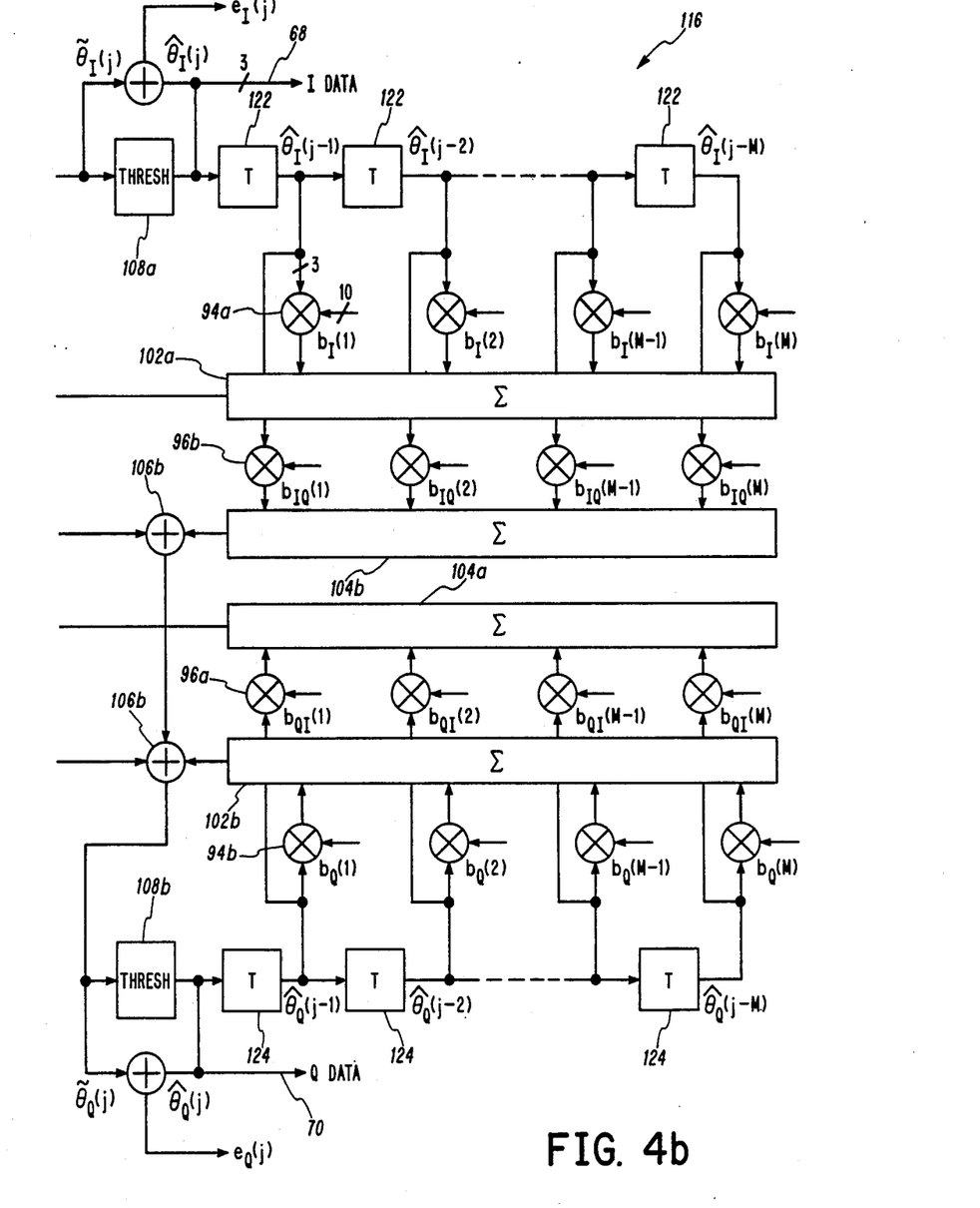
FIG. 4b is a symbolic representation of a preferred form of an equalizer element cooperatively connected to the equalizer element of FIG. 4a to form an autoequalizer according to the present invention.

Referring now to FIG. 4, another embodiment of an autoequalizer according to the present invention is referred to generally by reference numeral 116 and is used mainly for illustration, altough it is possible to construct such an autoequalizer. Similar elements are given similar numbers as used in illustrating equalizer element 64 of FIG. 3, followed by the letter "a" for elements corresponding to those in equalizer element 64 and followed by "b" for elements corresponding to those in equalizer element 66. In such an arrangement first means for storing a window of consecutive data samples from a continuous data stream comprises time delay elements 118, responsively connected to first data channel 82. Second means for storing a window of consecutive data samples from a continuous data stream comprises time delay elements 120 responsively connected to second data channel 84. Means for storing consecutive results of equalized I output data from channel 68 comprises time delay elements 122, and means for storing consecutive results of equalized Q output data from channel 70 comprises serially connected time delay elements 124.

It can now be seen that an all digital decision-feedback adaptive equalizer can be realized using the present invention. In its preferred forms, the autoequaliser has no wasted process cycles. Each process cycle computes a tap of the equalization filter. The length, or order of the equalization filter, can be changed by simply changing the number of process cycles in a baud interval. No other hardware changes are required.

In a preferred form, both data stores and coefficient stores are interleaved to help minimize the amount of memory required for the autoequalizer. This is convenient to this implementation and lowers the cost of memory and its control.

The order of processing provides for minimum computation throughput time, easing the problem of passing I and Q cross-terms between different parts of the autoequalizer. This also reduces the absolute delay through the equalizer. Processing for a given baud interval begins before data is presented for that interval.

When the communication system is initialized, known test information can be transmitted to allow controller 76 to adjust the various coefficients to achieve the known values for the test data.

From the foregoing it will be seen that this invention is one well adapted to obtain all of the ends and objects hereinabove set forth, together with other advantages which are obvious and which are inherent to the apparatus.

It will be understood that certain features and subcombinations are of utility and may be employed without reference to other features and subcombinations. This is contemplated by and is within the scope with the claims.

As many possible embodiments may be made of the invention without departing from the scope thereof, it is to be understood that all matter herein set forth or shown in the accompanying drawing is to be interpreted as illustrative and not in a limiting sense.

I claim:

1. An autoequalizer for receiving continuous data streams from a first data channel and a second data channel, wherein the two data streams had originally been mixed with carriers for transmission over a single channel with a carrier of one data stream orthogonal to the carrier of the other data stream, comprising in combination:
   first means for storing consecutive data samples forming a time window from a continuous data stream, responsively connected to the first data channel;
   second means for storing consecutive data samples forming a time window from a continuous data stream, responsively connected to the second data channel;
   first means for providing a plurality of constants, the constants corresponding to the data samples of the first means for storing;
   second means for providing a plurality of constants, the constants corresponding to the data samples of the second means for storing;
   first means for mathematically operating, wherein each data sample stored in the first means for storing is mathematically operated on with the corresponding constant from the first means for providing a plurality of constants;
   second means for mathematically operating, wherein each data sample stored in the second means for storing is mathematically operated on with the corresponding constant from the second means for providing a plurality of constants;
   first means for summing the results of the first means for mathematicallly operating;
   second means for summing the results of the second means for mathematically operating;
   means responsive to the first and second means for summing for generating a number corresponding to an expected value for each data sample as it existed before being originally mixed; and
   means for accumulating the results of the first means for summing, the second means for summing and the means for generating a number corresponding to an expected value.

2. An autoequalizer according to claim 1 further comprising means for testing the results of the means for accumulating against a plurality of predetermined threshold values.

3. An autoequalizer according to claim 1 wherein each of the first and second means for mathematically operating comprises means for multiplying.

4. An autoequalizer according to claim 3 further comprising:
   first means for dynamically changing constants from one time window to another time window, operably connected the first means for providing constants;
   second means for dynamically changing constants from one time window to another time window, operably connected to the second means for providing constants.

5. An autoequalizer according to claim 1 further comprising:
   first means for dynamically changing constants from one time window to another time window, operably connected to the first means for providing constants; and
   second means for dynamically changing constants from one time window to another time window, operably connected to the second means for providing constants.

6. An autoequalizer for receiving continuous data streams from a first data channel and a second data channel, wherein the two data streams had originally been mixed with carriers for transmission over a single channel with a carrier of one data stream orthogonal to the carrier of the other data stream, comprising in combination:
   first means for storing consecutive data samples forming a time window from a continuous data stream, responsively connected to the first data channel;
   second means for storing consecutive data samples forming a time window from a continuous data stream responsively connected to the second data channel;
   first means for providing a plurality of constants, the constants corresponding to the data samples of the means for storing;
   second means for providing a plurality of constants, the constants corresponding to the data samples of the second means for storing;
   first means for mathematically operating, wherein each sample stored in the first means for storing is mathematically operated on with the corresponding constant from the first means for providing a plurality of constants;
   second means for mathematically operating, wherein each data sample stored in the second means for storing is mathematically operated on with the corresponding constant from the second means for providing a plurality of constants;
   first means for summing the results of the first means for mathematically operating;
   second means for summing the results of the second means for mathematically operating;

means responsive to the first and second means for summing for generating a number corresponding to an expected value for each data sample as it existed before being originally mixed;

means for accumulating the results of the first means for summing, the second means for summing and the means for generating a number corresponding to an expected value;

means for testing the results of the means for accumulating against a plurality of predetermined threshold values;

wherein the means for generating a number corresponding to an expected value comprises in combination:

means for storing consecutive results of the tests from the means for testing;

third means for providing a plurality of constants, the constants corresponding to the consecutive results of the means for storing consecutive test results;

third means for mathematically operating, wherein each of the test results from the means for storing test results is mathemically opeated on with the corresponding constant from the third means for providing a plurality of constants; and means for summing the results of the third means for mathematically operating.

7. An autoequalizer according to claim 6 wherein each of the first, second and third means for mathematically operating comprises means for multiplying.

8. An autoequalizer accordig to claim 7 further comprising:

first means for dynamically changing constants from one time window to another time window, operably connected to the first means for providing constants;

second means for dynamically changing constants from one time window to another time window, operably connected to the second means for providing constants; and third means for dynamically changing constants, from one time window to another time window, operably connected to the third means for providing constants.

9. An autoequalizer for receiving continuous data streams from a first data channel and a second data channel, wherein the two data streams had originally been mixed with carriers for transmission over a single channel with a carrier of one data stream orthogonal to the carrier of the other data stream, comprising in combination:

first means for storing consecutive data samples forming a time window from a continuous data stream, responsively connected to the first data channel;

second means for storing consecutive data samples forming a time window from a continuous data channel;

first means for providing a plurality of constants, the constants corresponding to the data samples of the first means for storing;

second means for providing a plurality of constants, the constants corresponding to the data samples of the second means for storing;

first means for mathematically operating, wherein each data sample stored in the first means for storing is mathematically operated on with the corresponding constant from the first means for providing a plurality of constants;

second means for mathematically operating, wherein each data sample stored in the second means for storing is mathematically operated on with the corresponding constant from the second means for providing a plurality of constants;

first means for summing the results of the first means for mathematically operating;

second means for summing the results of the second means for mathematically operating;

means responsive to the first and second means for summing for generating a number corresponding to an expected value for each data sample as it existed before being originally mixed;

means for accumulating the results of the first means for summing, the second means for summing and the means for generating a number corresponding to an expected value;

wherein the means for generating a number corresponding to an expected value comprises in combination:

means for storing consecutive results of the tests from the means for testing;

third means for providing a plurality of constants, the constants corresponding to the consecutive results of the means for storing consecutive test results;

third means for mathematically operating, wherein each of the test results from the means for storing test results is mathematically operated on with the corresponding constant from the third means for providing a plurality of constants; and means for summing the results of the third means for mathematically operating.

10. An autoequalizer according to claim 9 wherein each of the first, second and third means for mathematically operating comprises means for multiplying.

11. An autoequalizer according to claim 10 further comprising:

first means for dynamically changing constants from one time window to another time window, operably connected to the first means for providing constants;

second means for dynamically changing constants from one time window to another time window, operably connected to the second means for providing constants; and third means for dynamically changing constants from one time window to another time window, operably connected to the third means for providing constants.

12. In a domodulation for an imput from a pair of data streams mixed with orthogonal carriers, the combination comprising:

a first data channel;

a second data channel;

means for demodulating the orthogonal signals, providing a first demodulated signal to the first data channel and a second domodulated signal to the second data channel;

first means for storing a window of consecutive data samples from a continuous data stream responsively connected to the first data channel;

second means for storing a window of consecutive data samples from a continuous data stream responsively connected to the second data channel;

first means for providing a plurality of constants, the constants corresponding to the consecutive data samples of the first means for storing;

second means for providing a plurality of constants, the constants corresponding to the consecutive data samples of the second means for storing;

first means for mathematically operating, wherein each of the consecutive data samples from the first means for storing is mathematically operated on the corresponding constant from the first means for providing a plurality of constants;

second means for mathematically operating, wherein each of the consecutive data samples from the second means for storing is mathematically operated on with the corresponding constant from the second means for providing a plurality of constants;

first means for summing the results of the first means for mathematically operating;

second means for summing the results of the second means for mathematically operating;

first means for feedback;

second means for feedback;

third means for storing a window of consecutive data samples from a continuous data stream responsively connected to the first data channel;

third means for providing a plurality of constants, the constants corresponding to the consecutive data samples of the third means for storing;

fourth means for providing a plurality of constants, the constants corresponding to the consecutive data samples of the fourth means for storing;

third means for mathematically operating, wherein each of the consecutive data samples from the third means for storing is mathematically operated on with the corresponding constant from the third means for providing a plurality of constants;

fourth means for mathematically operating, wherein each of the consecutive data samples from the fourth means for storing is mathematically operated on with the corresponding constant from the fourth means for providing a plurality of constants;

third means for summing the results of the third means for mathematically operating;

fourth means for summing the results of the fourth means for mathematically operating;

fourth means for mathematically operating;

third means for feedback;

fourth means for feedback;

first means for accumulating the results of the first means for summing, the second means for summing, the first means for feedback and the third means for feedback; and second means for accumulating the results of the third means for summing, the fourth means for summing, the second means for feedback and the fourth means for feedback, wherein the first and fourth means for feedback feed back from the first means for accumulating and wherein the second and third means for feedback feed back from the second means for accumulating.

* * * * *